United States Patent
Chen et al.

(10) Patent No.: US 8,059,376 B2
(45) Date of Patent: Nov. 15, 2011

(54) ESD CLAMP FOR HIGH VOLTAGE OPERATION

(75) Inventors: Kuo-Ji Chen, Taipei (TW); Guang-Cheng Wang, Zhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 12/701,996

(22) Filed: Feb. 8, 2010

(65) Prior Publication Data

US 2011/0194218 A1    Aug. 11, 2011

(51) Int. Cl.
- *H02H 9/00* (2006.01)
- *H01C 7/12* (2006.01)
- *H02H 1/00* (2006.01)
- *H02H 1/04* (2006.01)
- *H02H 3/22* (2006.01)

(52) U.S. Cl. .......................................... 361/56; 361/118
(58) Field of Classification Search ...................... 361/56
See application file for complete search history.

(56) References Cited

U.S. PATENT DOCUMENTS

| | | | |
|---|---|---|---|
| 5,610,791 A | 3/1997 | Voldman | |
| 5,956,219 A | 9/1999 | Maloney | |
| 6,954,098 B2 | 10/2005 | Hsu et al. | |
| 7,289,307 B2 * | 10/2007 | Ker et al. | 361/56 |
| 7,397,642 B2 * | 7/2008 | Ker et al. | 361/56 |
| 7,667,936 B2 * | 2/2010 | Ker et al. | 361/56 |

* cited by examiner

*Primary Examiner* — Dharti Patel
(74) *Attorney, Agent, or Firm* — Slater & Matsil, L.L.P.

(57) ABSTRACT

An electrostatic discharge (ESD) clamp includes a first power source configured to provide a first power supply voltage, a power supply node coupled to the first power source and receiving the power supply voltage; and a first NMOS transistor and a second NMOS transistor coupled in series and between the power supply node and a VSS node. The first NMOS transistor and the second NMOS transistor are low nominal VDD devices with maximum endurable voltages lower than the power supply voltage. The ESD claim further includes an ESD detection circuit including a capacitor coupled between the power supply node and a gate of the second NMOS transistor, and a resistor coupled between the gate of the second NMOS transistor and the VSS node.

19 Claims, 2 Drawing Sheets

ESD CLAMP FOR HIGH VOLTAGE OPERATION

TECHNICAL FIELD

This disclosure relates generally to electrostatic discharge (ESD) circuits, and more particularly to ESD clamps formed using low nominal VDD devices.

BACKGROUND

Electrostatic discharge (ESD) is a known problem in the manufacturing and using of integrated circuits. Typically, integrated transistors have thin oxides and insulating layers that can be damaged by the electrostatic discharge, and special care is required to protect the integrated circuits from the damage caused by ESD.

As device sizes continue to shrink, the damage occurring to transistors and caused by ESD pulses becomes increasingly more severe. The integrated circuits coupled between VDD and VSS nodes cannot handle the relatively large current in short time and the integrated circuits may be damaged. FIG. 1 illustrates an exemplary circuit including a pad for input or output, a VDD node, a VSS node, and a power clamp coupled between the VDD node and the VSS node. The power clamp includes NMOS transistors N1 and N2 that are cascaded between the VDD node and the VSS node. NMOS transistors N1 and N2 may be low nominal VDD devices, which means that the maximum allowable gate-to-source or the maximum gate-to-drain voltage for each of NMOS transistors N1 and N2 is lower than voltage VDD. If the gate-to-source or the gate-to-drain voltages are greater than voltage VDD, NMOS transistors N1 and N2 will be damaged. The parasitic bipolar transistor BP, which is formed between the drain of NMOS transistor N1, the source of NMOS transistor N2, and the substrate of the respective chip, acts as the ESD device that becomes conductive to conduct ESD currents.

The power clamp in FIG. 1 has a high ESD trigger voltage equal to or higher than about 8.5V. However, the circuit that is to be protected by the power clamp, such as the schematically illustrated inverter INV, also has a parasitic bipolar transistor (not shown) that will be turned on to conduct the ESD current at a trigger voltage equal to about 7.1V. This means that the protected circuit may be turned on before the activation of the power clamp. Since the protected circuit is not designed to handle the relatively high ESD current, it may be damaged, and the power clamp fails to protect the circuit that it is designed to protect.

SUMMARY

In accordance with one aspect, an electrostatic discharge (ESD) clamp includes a first power source configured to provide a power supply voltage, a power supply node coupled to the first power source and receiving the power supply voltage; and a first NMOS transistor and a second NMOS transistor coupled in series and between the power supply node and a VSS node. The first NMOS transistor and the second NMOS transistor are low nominal VDD devices with maximum endurable voltages lower than the power supply voltage. The ESD claim further includes an ESD detection circuit including a capacitor coupled between the power supply node and a gate of the second NMOS transistor, and a resistor coupled between the gate of the second NMOS transistor and the VSS node.

Other embodiments are also disclosed.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative and do not limit the scope of the disclosure.

A novel electrostatic discharge (ESD) clamp is provided in accordance with an embodiment. The variations and the operation of the embodiment are discussed. Throughout the various views and illustrative embodiments, like reference numbers are used to designate like elements.

Figure 2:
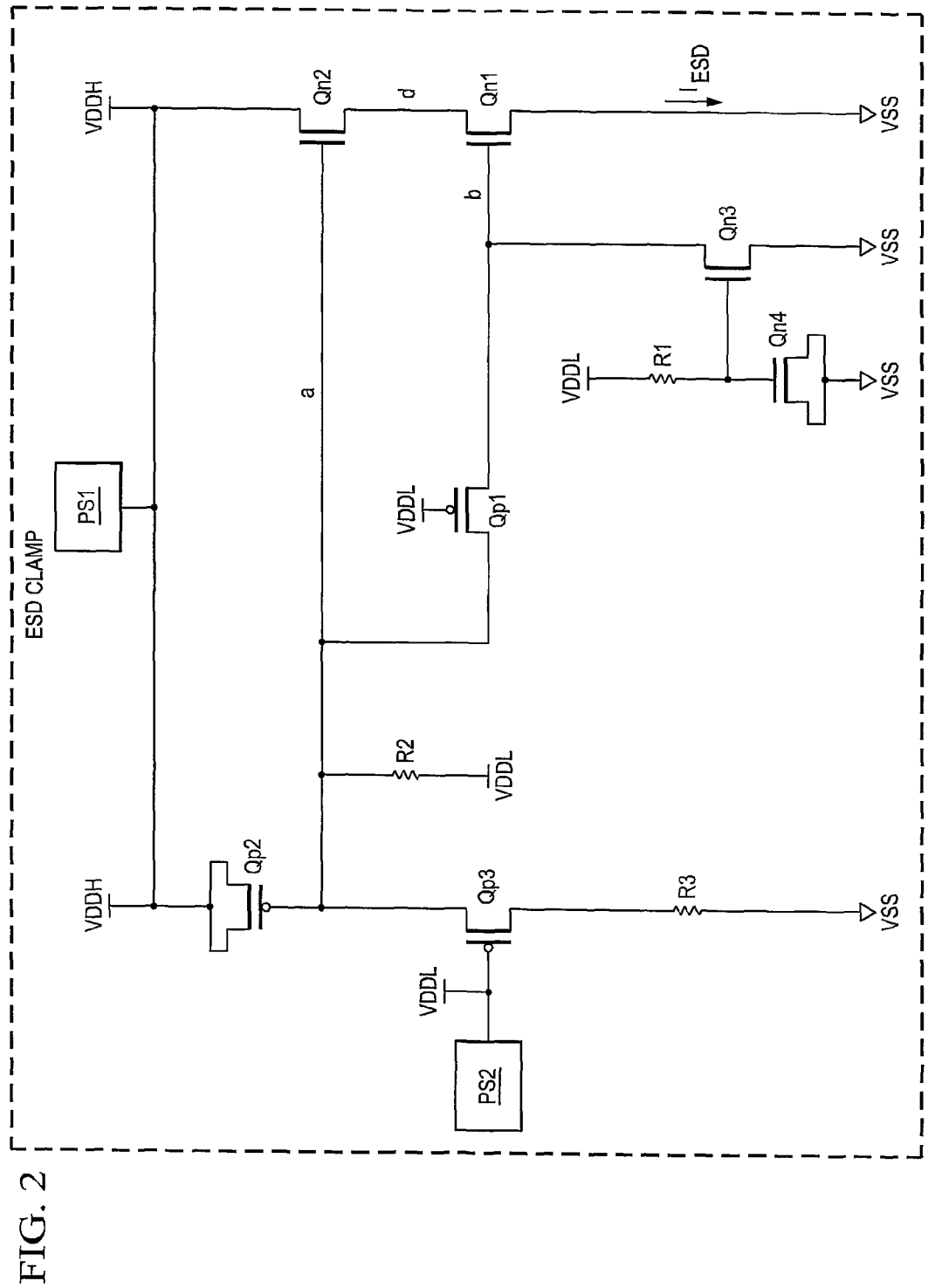
FIG. 2 illustrates a power clamp including low nominal VDD devices in accordance with an embodiment.

FIG. 2 illustrates a circuit diagram of a power clamp in accordance with an embodiment. The power clamp is coupled between power supply nodes VDDH and VSS. In an embodiment, the VSS node is the electrical ground. Power supply node VDDH may have a first positive power supply voltage, which is also denoted as VDDH. Power source PS1 comprises an output coupled to power supply node VDDH, which provides power supply voltage VDDH. The power clamp is further coupled to a second positive power supply node VDDL. Power supply node VDDL may have a power supply voltage, which is also denoted as VDDL. Power source PS2 comprises an output coupled to power supply node VDDL, which provides power supply voltage VDDL. Although not illustrated, all power supply nodes VDDL may be interconnected and may actually be the same node. Power supply voltage VDDL is lower than power supply voltage VDDH. In an embodiment, power supply voltage VDDL is lower than about 80 percent, or even lower than about 65 percent, of power supply voltage VDDH. In an exemplary embodiment, power supply voltage VDDH is 3.3V, and power supply voltage VDDL is 1.8V. It is realized, however, that the voltages recited throughout the description are merely examples.

NMOS transistors Qn1 and Qn2 are coupled in series between power supply nodes VDDH and VSS. NMOS transistors Qn1 and Qn2 form the discharging path of the ESD current. The gate (denoted as node "b") of transistor Qn1 is coupled to the drain of NMOS transistor Qn3. The gate of NMOS transistor Qn3 is coupled to power supply voltage VDDL through resistor R1, and to the VSS node through capacitor Qn4, which may be formed of a transistor with its source and drain interconnected. Throughout the description, capacitor Qn4 may also be referred to as transistor Qn4.

The gates of NMOS transistors Qn1 and Qn2 are separated from each other by PMOS transistor Qp1, which acts as a switch. Accordingly, the gates of NMOS transistors Qn1 and Qn2 may be interconnected or disconnected, depending on the operation status of PMOS transistor Qp1. The gate of NMOS transistor Qn2 is further coupled to power supply node VDDL through resistor R2.

Figure 1:
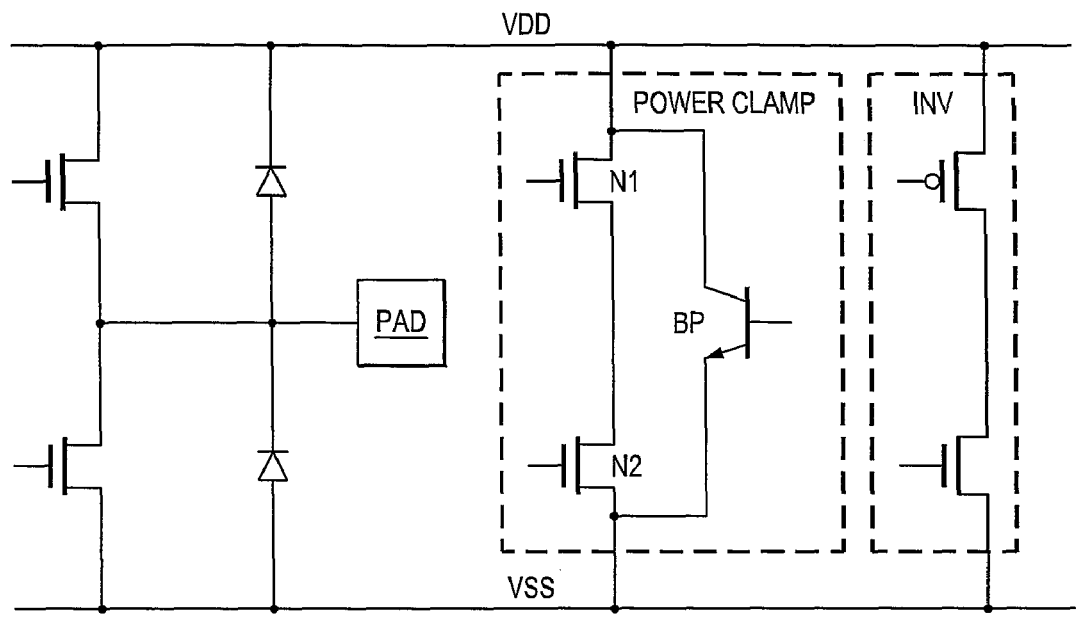
FIG. 1 illustrates a conventional power clamp formed of two cascaded NMOS transistors.
Figure 3:
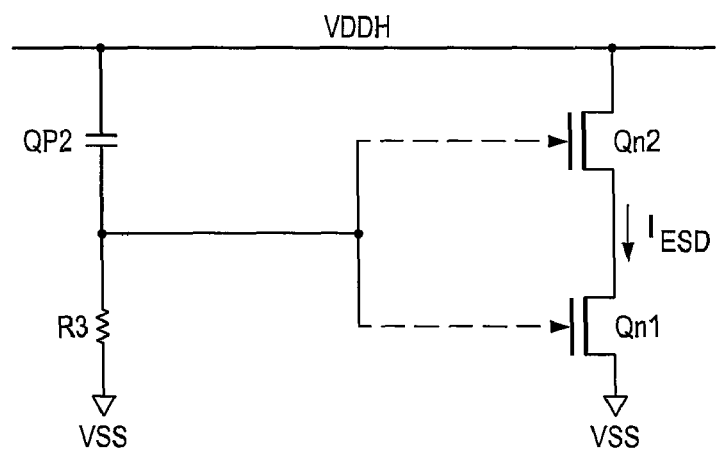
FIG. 3 illustrates a simplified scheme of the embodiment as shown in FIG. 2.

Capacitor Qp2, PMOS transistor Qp3, and resistor R3 form an ESD detection circuit, which activates the ESD discharging path formed of NMOS transistors Qn1 and Qn2, as is schematically illustrated in FIG. 3. Capacitor Qp2, which may be formed of a transistor with its source and drain interconnected, is coupled between power supply node VDDH and the gate of NMOS transistor Qn2 (denoted as node "a") (refer to FIG. 2). Throughout the description, capacitor Qp2 may also be referred to as transistor Qp2. PMOS transistor Qp3 and resistor R3 are coupled between node a and the VSS node. The gate of PMOS transistor Qp3 may be coupled to power supply node VDDL.

In an embodiment, at least one, and possibly all, of transistors Qn1, Qn2, Qn3, Qp1, Qp2, Qp3, and/or Qn4 are low nominal VDD devices, which means that these transistors are designed to sustain operating voltages lower than power supply voltage VDDH. In other words, the maximum allowable gate-to-drain voltages and gate-to-source voltages (referred to as maximum endurable voltages) of these transistors are lower than power supply voltage VDDH. During the operation of the respective chip, the gate-to-drain voltages and gate-to-source voltages applied to the transistors in the power clamp need to be no higher than the respective maximum endurable voltages. Otherwise, transistors Qn1, Qn2, Qn3, Qp1, Qp2, Qp3, and/or Qn4 may be damaged and the gate oxides of these transistors may be broken down. The maximum endurable voltages may be lower than about 90 percent, or even lower than about 80 percent, of power supply voltage VDDH. On the other hand, the maximum endurable voltages of transistors Qn1, Qn2, Qn3, Qp1, Qp2, Qp3, and/or Qn4 may be greater than power supply voltage VDDL. In an exemplary embodiment, the maximum endurable voltages are equal to or greater than about 110 percent of power supply voltage VDDL, and may be equal to about 1.98V.

During the normal operation of the power clamp, no ESD transient occurs, and the power clamp does not conduct currents from power supply node VDDH to the VSS node. To explain the concept of the embodiment, an exemplary operation status of the power clamp during the normal operation is discussed as follows, with the exemplary voltage values VDDH being equal to 3.3V, and VDDL being equal to 1.8V. Since node a is coupled to power supply voltage VDDL through resistor R2, the voltage at node a is equal to about 1.8V. NMOS transistor Qn2 is thus turned on, and the source node (node d) (refer to FIG. 2) of NMOS transistor Qn2 is at about 1.4V. Accordingly, the gate-to-source and gate-to-drain voltages of NMOS transistor Qn2 are both lower than the respective maximum endurable voltage, which may be 1.98V, for example.

With the gate of NMOS transistor Qn3 being coupled to power supply voltage VDDL (1.8V), NMOS transistor Qn3 is turned on, and hence node b (the drain of NMOS transistor Qn3) is pulled down to voltage VSS. NMOS transistor Qn1 is thus turned off. Again, the gate-to-source and gate-to-drain voltages of NMOS transistors Qn1 and Qn3 are lower than the respective maximum endurable voltages. PMOS transistor Qp1 is turned off since its gate voltage is 1.8V. Accordingly, gate a of NMOS transistor Qn2 is disconnected from gate b of NMOS transistor Qn1.

When an ESD transient occurs to node VDDH, the chip (and the power networks of power supply voltages VDDH and VDDL) in which the power clamp is located, is equivalent to powered off. Therefore, power nodes VDDH and VDDL are equivalent to floating, and the static power supply voltages VDDL and VDDH are equivalent to 0V. The ESD voltage (which is a dynamic voltage) at node VDDH, however, is greater than 0V. Assuming the ESD voltage at node VDDH reaches the threshold voltage of the power clamp, which may be about 1V in an exemplary embodiment, since capacitor Qp2 is conductive for the ESD transient, node a is also at 1V. With both the drain voltage and gate voltage of NMOS transistor Qn2 being at about 1V, NMOS transistor Qn2 is turned on.

Since the static voltage at node VDDL is 0V, PMOS transistor Qp1 is turned on. Accordingly, the ESD voltage of 1V is passed to node b, which is the gate of NMOS transistor Qn1. In the meantime, NMOS transistor Qn3 is turned off since its gate is coupled to node VDDL (which is floating) through resistor R1. NMOS transistor Qn1 is thus also turned on. ESD current $I_{ESD}$ (refer to FIG. 2) thus flows through NMOS transistors Qn1 and Qn2, and the charges built at node VDDH are discharged to the VSS node. This prevents the excess increase in the ESD voltage at node VDDH. During the ESD discharging process, PMOS transistor Qp3 is turned on since its gate is coupled to node VDDL.

It is noted that during the entire normal operation and the ESD discharging process, the gate-to-source and gate-to-drain voltages of all of the transistors in the power clamp are all lower than the maximum endurable voltages. Accordingly, transistors Qn1, Qn2, Qn3, Qp1, Qp2, Qp3, and/or Qn4 may be formed of low nominal VDD devices, while the respective power clamp can still be used for the ESD discharging of high power supply voltages VDDH, which is significantly higher than the maximum endurable voltages of these transistors. In an embodiment, power supply voltage VDDL may be the core power supply voltage, and transistors Qn1, Qn2, Qn3, Qp1, Qp2, Qp3, and/or Qn4 may be formed simultaneously as the formation of the core devices in the core circuits that are driven by the core supply voltage. This means that the masks for forming I/O devices may be saved and manufacturing costs may be saved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An electrostatic discharge (ESD) clamp comprising:
   a first power source configured to provide a first power supply voltage;
   a first power supply node coupled to the first power source and receiving the first power supply voltage;
   a VSS node;
   a first NMOS transistor and a second NMOS transistor coupled in series and between the first power supply node and the VSS node, wherein the first NMOS transistor and the second NMOS transistor are low nominal VDD devices with maximum endurable voltages lower than the first power supply voltage; and
an ESD detection circuit comprising:
a first capacitor coupled between the first power supply node and a gate of the second NMOS transistor; and
a first resistor coupled between the gate of the second NMOS transistor and the VSS node.

2. The ESD clamp of claim 1, wherein all transistors and capacitors formed of transistors in the power clamp are low nominal VDD devices with maximum endurable voltages lower than the first power supply voltage.

3. The ESD clamp of claim 1 further comprising:
a second power source configured to provide a second power supply voltage lower than the first power supply voltage;
a second power supply node coupled to the second power source and receiving the second power supply voltage; and
a first PMOS transistor comprising:
a first source/drain region coupled to a gate of the first NMOS transistor;
a second source/drain region coupled to the gate of the second NMOS transistor; and
a gate coupled to the second power supply node, wherein the gate is configured to be at the second power supply voltage.

4. The ESD clamp of claim 3 further comprising a third NMOS transistor comprising:
a drain coupled to the gate of the first NMOS transistor;
a gate coupled to the second power supply node through a second resistor; and
a source coupled to the VSS node.

5. The ESD clamp of claim 4 further comprising a second capacitor coupled between the gate of the third NMOS transistor and the VSS node.

6. The ESD clamp of claim 3 further comprising a second PMOS transistor comprising:
a drain coupled to the gate of the second NMOS transistor;
a gate coupled to the second power supply node; and
a source, wherein the first resistor is coupled between the source of the second PMOS transistor and the VSS node.

7. The ESD clamp of claim 1, wherein the maximum endurable voltages are lower than about 65 percent of the first power supply voltage.

8. An electrostatic discharge (ESD) clamp comprising:
a first power supply node;
a second power supply node electrically disconnected from the first power supply node;
a first NMOS transistor comprising a source coupled to a VSS node;
a second NMOS transistor comprising a drain coupled to the first power supply node, and a source coupled to a drain of the first NMOS transistor; and
a first PMOS transistor comprising:
a first source/drain region coupled to a gate of the first NMOS transistor, wherein the first source/drain region is configured to have a voltage substantially equal to a voltage at the gate of the first NMOS transistor;
a second source/drain region coupled to a gate of the second NMOS transistor, wherein the second source/drain region is configured to have a voltage substantially equal to a voltage at the gate of the second NMOS transistor; and
a gate coupled to the second power supply node.

9. The ESD clamp of claim 8 further comprising a resistor comprising a first end coupled to the gate of the second NMOS transistor, and a second end coupled to the second power supply node.

10. The ESD clamp of claim 8 further comprising:
a capacitor coupled between the first power supply node and the gate of the second
a resistor coupled between the gate of the second NMOS transistor and the VSS node.

11. The ESD clamp of claim 8 further comprising:
a first power source coupled to the first power supply node and configured to provide a first power supply voltage; and
a second power source coupled to the second power supply node and configured to provide a second power supply voltage lower than the first power supply voltage, wherein the first NMOS transistor and the second NMOS transistor are low nominal VDD devices with maximum endurable voltages lower than the first power supply voltage and higher than the second power supply voltage.

12. The ESD clamp of claim 8 further comprising a third NMOS transistor comprising:
a drain coupled to a gate of the first NMOS transistor, wherein the drain is configured to have a voltage substantially equal to the voltage at the gate of the first NMOS transistor;
a gate coupled to the second power supply node through a resistor; and
a source coupled to the VSS node.

13. The ESD clamp of claim 12 further comprising a capacitor coupled between the gate of the third NMOS transistor and the VSS node.

14. An electrostatic discharge (ESD) clamp comprising:
a first power supply node carrying a first power supply voltage;
a second power supply node electrically disconnected from the first power supply node, wherein the second power supply node carries a second power supply voltage;
a first NMOS transistor comprising a source coupled to a VSS node;
a second NMOS transistor comprising a drain coupled to the first power supply node, and a source coupled to a drain of the first NMOS transistor, wherein the first NMOS transistor and the second NMOS transistor are low nominal VDD devices with maximum endurable voltages lower than the first power supply voltage and higher than the second power supply voltage; and
a first resistor comprising a first end coupled to a gate of the second NMOS transistor, and a second end coupled to the second power supply node.

15. The ESD clamp of claim 14, wherein the first end of the first resistor is directly connected to the gate of the second NMOS transistor.

16. The ESD clamp of claim 14 further comprising a first PMOS transistor comprising:
a first source/drain region coupled to a gate of the first NMOS transistor, wherein the first source/drain region is configured to have a voltage substantially equal to a voltage at the gate of the first NMOS transistor;
a second source/drain region coupled to the gate of the second NMOS transistor, wherein the second source/drain region is configured to have a voltage substantially equal to a voltage at the gate of the second NMOS transistor; and
a gate coupled to the second power supply node.

17. The ESD clamp of claim 14 further comprising:
a capacitor coupled between the first power supply node and the gate of the second NMOS transistor; and
a resistor coupled between the gate of the second NMOS transistor and the VSS node.

18. The ESD clamp of claim 14 further comprising:
a first power source coupled to the first power supply node and configured to provide a first power supply voltage; and
a second power source coupled to the second power supply node and configured to provide a second power supply voltage lower than the first power supply voltage.

19. The ESD clamp of claim 14 further comprising:
a third NMOS transistor comprising:
    a drain coupled to a gate of the first NMOS transistor;
    a source coupled to the VSS node; and
    a gate coupled to the second power supply node; and
a capacitor coupled between the gate of the third NMOS transistor and the VSS node.

* * * * *